Aug. 4, 1953
W. F. BERCK
2,647,531
FLOW CONTROL VALVE
Filed July 20, 1946
2 Sheets-Sheet 1
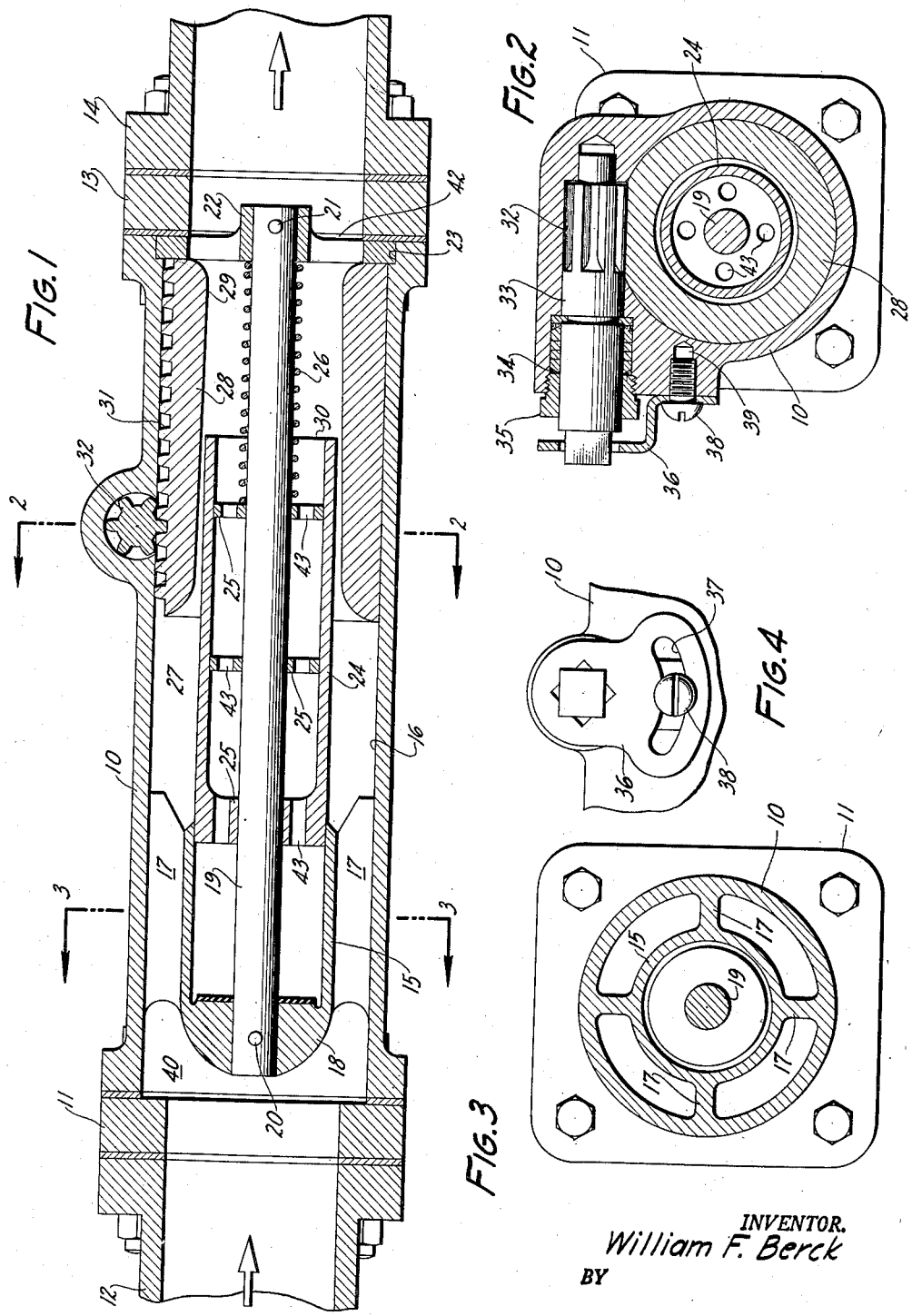
INVENTOR.
William F. Berck
BY
Mellin & Hanscom
ATTORNEYS Aug. 4, 1953  W. F. BERCK  2,647,531
FLOW CONTROL VALVE
Filed July 20, 1946  2 Sheets-Sheet 2
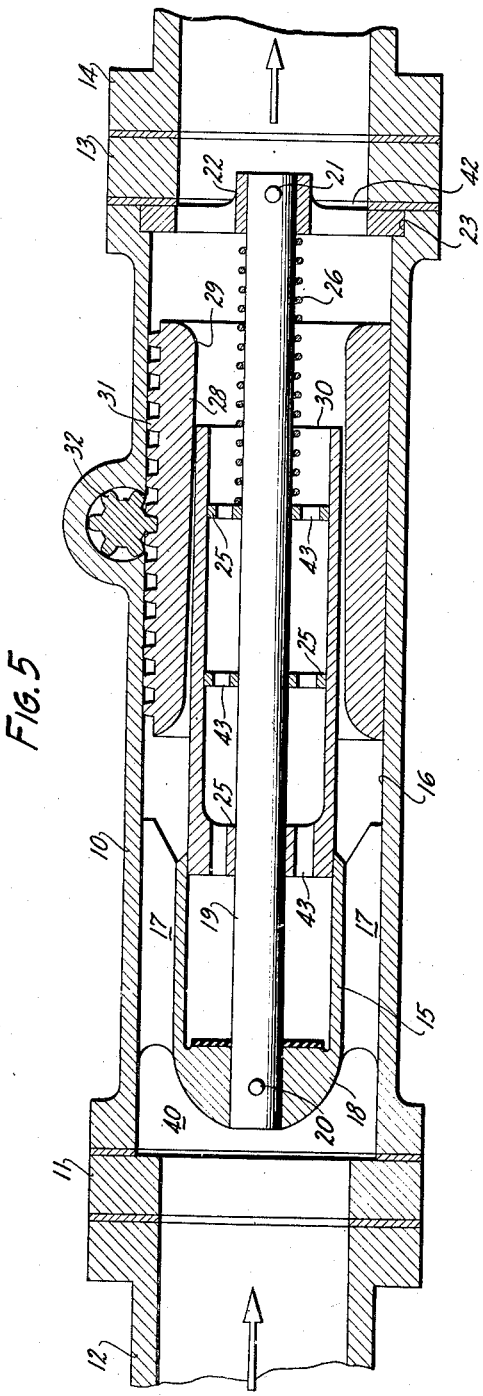
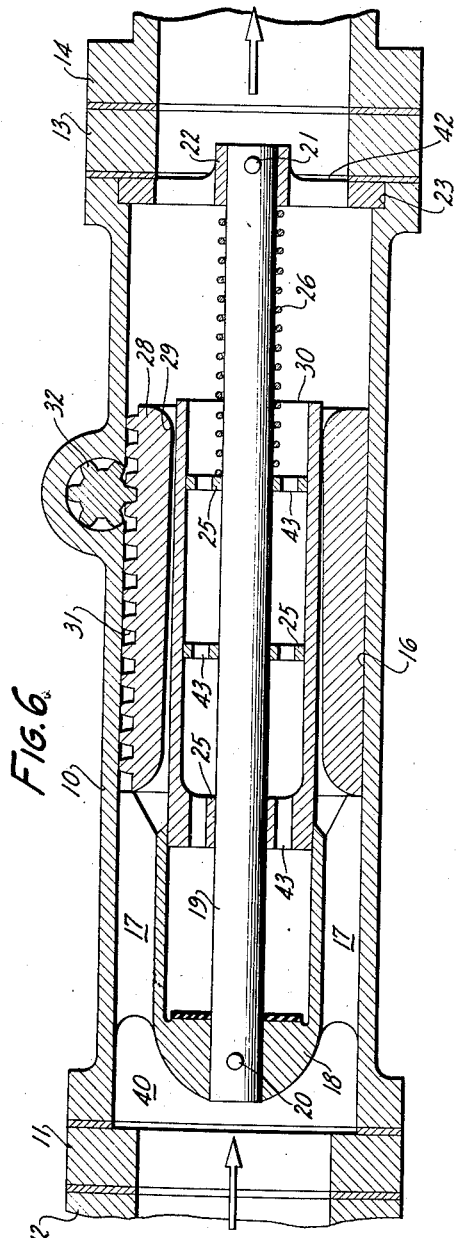
INVENTOR.
William F. Berck
BY
Mellin & Hanscom
ATTORNEYS Patented Aug. 4, 1953

2,647,531

UNITED STATES PATENT OFFICE 2,647,531

FLOW CONTROL VALVE

William F. Berck, Hayward, Calif., assignor to Ralph N. Brodie Company, Oakland, Calif., a corporation of California Application July 20, 1946, Serial No. 685,069

8 Claims. (Cl. 137—220)

This invention relates to valve mechanisms, and more particularly to valves for automatically controlling the flow of fluids in pipe and similar lines.

It is an object of the present invention to provide a simple and compact valve mechanism capable of automatically maintaining the flow of fluid in a line substantially constant, despite variations in pressure conditions over a comparatively wide operating range.

A further object of the invention is to provide a valve mechanism for automatically maintaining fluid flow in a line at a preselected rate, irrespective of variations in line pressure, differential pressures across the valve mechanism, or other variable factors.

Another object of the invention is to automatically maintain the quantity of flow through the valve at a substantially constant value in response to changes in flow velocity and independently of pressure differentials across the valve.

Yet a further object of the invention is to provide a valve mechanism through which the desired rate of fluid flow may be preselected and maintained substantially constant automatically by variations in flow velocity through a definite velocity range, such range being constant regardless of the preselected quantity of flow per unit of time.

In its general aspects, the invention includes a valve mechanism having a variable aperture, whose area is automatically changed in response to changes in the velocity of the fluid flowing through the valve mechanism. The size of the aperture is first adjusted for delivery of a predetermined quantity of flow per unit of time under certain pressure operating conditions. Any changes in the velocity with which the fluid is passing through the aperture from such certain condition automatically effects variation in the size of the aperture, to keep the volumetric rate of fluid flow constant. That is, any tendency for the velocity of fluid flow to increase produces an automatic decrease in the size of the aperture, allowing the fluid to pass through the smaller aperture at the increased velocity, but without any increase in the quantity of fluid flowing per unit of time. Conversely, any tendency for the rate of fluid flow through the aperture to decrease effects an increase in the area of the aperture, maintaining the quantity of fluid flowing substantially constant at the decreased velocity rate. The mechanism is so arranged as to be independent of pressure differentials across the valve, and operates over the same differential velocity range for various flow quantities for which the valve may have been adjusted.

One form which the invention may assume is exemplified in the following description and illustrated by way of example in the accompanying drawings, in which:

Fig. 1 is a longitudinal section through a flow control valve.

Fig. 2 is a cross-section taken along the line 2—2 of Fig. 1.

Fig. 3 is a cross-section taken along the line 3—3 of Fig. 1.

Fig. 4 is a side elevation of the adjusting device as seen from the left of Fig. 2.

Fig. 5 is a view similar to Fig. 1, showing the valve adjusted for delivering a different volume of fluid.

Fig. 6 is a view similar to Fig. 1, showing the valve adjusted for delivering still another volume of fluid.

In the embodiment of the invention exemplified in the drawings, an elongated body 10 is provided, forming part of a pipe line through which fluid is to flow under controlled conditions. A flange 11 is secured to one end of the body for attachment to one pipe line section 12, and another flange 13 is secured to the other end of the body for attachment to another section 14 of the pipe line, the body 10, in effect, holding the pipe line sections in spaced relation.

A cylinder 15 is disposed in the body near its high pressure end, and is held coaxially in the cylindrical body bore 16 by a plurality of longitudinally extending centering ribs 17. The cylinder has a head 18 closing its outer end, to which a shaft or rod 19 is secured by means of a pin 20. This shaft extends out of the cylinder and through the body toward the low pressure or outlet end of the latter, where it is secured by a pin 21 to a spider 22 fitted within a body recess 23 adjacent the flange 13. The shaft 19 is thus held by the cylinder 15 and spider 22 coaxially of the body bore 16.

A piston 24 is mounted on the rod 19 and in the cylinder 15, being supported for sliding on the rod by inwardly extending plates or flanges 25. The piston is urged into the cylinder by a compressed helical spring 26, which has one end abutting the piston 24 and its other end the spider 22. The spring tends to shift the piston inwardly within the cylinder to its fullest extent; that is, toward the inlet end of the body 10.

An annular cone 27 is mounted adjustably within the body, and is provided with an inner tapered surface 28 converging toward the outlet end of the body, or in a direction away from the cylinder 15. This tapered surface 28 forms a variable aperture 29 with the end 30 of the piston, depending upon their relative longitudinal position. The greater the location of the piston 24 within the tapered cones 27, the less is the effective annular area of the variable aperture; while, conversely, the less the distance of the piston in the cone, the greater is the area of the annular aperture.

The position of the cone 27 in the body 10 may be altered by suitable adjusting means, which, as shown in the drawings, may consist of a rack 31 formed on the exterior of the cone engageable with a pinion 32 integral with, or otherwise secured to, a shaft 33 journaled laterally in the body 10. The shaft extends from the body through a packing 34 held in leakproof relation against the shaft surface by a suitable packing nut 35.

Rotation of the shaft 33 in either direction correspondingly positions the cone 27 within the body and predetermines the volumetric rate of flow which is to be maintained through the valve mechanism. Such rotation may be effected by an adjustable locking arm 36 secured on the outer end of the shaft 33 and having an arcuate slot 37 through which a lock screw 38 may extend into threaded engagement with a hole 39 in the valve body. Loosening of the screw 38 permits the arm 36 to be rotated within the limits of the arcuate slot 37 to correspondingly rotate the shaft 33, and, through the pinion 32 and rack 31, adjust the cone 27 lengthwise in the body 10. When the desired position of adjustment is reached, the screw 38 may be tightened to lock the cone in such selected position.

The fluid enters the high pressure end 40 of the valve body 10 from the pipe line section 12 through the flange, flowing around the cylinder head 18 and between the centering ribs 17 on the cylinder into the annular bore 16 of the body around the piston 24. It then passes through the tapered or variable aperture 29 between the inner end 30 of the piston and the cone 27 for outward passage through the centering spider 22 at the low pressure end 42 of the body, and through the flange 13 into the other pipe line section 14. The cone 27 will have been adjusted to provide the particular quantity of fluid flow per unit of time desired through suitable manipulation of the rack and pinion mechanical actuating mechanism. Under the normal flow conditions present in the pipe line, the velocity of the fluid passing along the exterior of the piston 24, and between the piston and the tapered surface 28 of the cone, will exert a force moving the piston toward the low pressure end 42 of the valve against the action of the helical spring 26, to provide an aperture of a certain annular area between the end 30 of the piston and the tapered side of the cone 27. Any variation from this normal operating condition either causes the piston to move further into the cone, to decrease the area of the aperture through which the fluid is flowing, or allows the piston 24, under the influence of the spring 26, to move into the cylinder 15, or in the diverging direction of the tapered surface, to effect an increase in the area.

As an example, let it be assumed that the cone 27 has been adjusted to its greatest extent away from the cylinder 15, to provide the maximum volumetric rate of fluid flow through the valve device, as shown in Figure 1. Under normal operating conditions at this maximum predetermined rate, the flow of fluid through the aperture 29 formed by the piston 24 and cone 27 holds the piston in a definite, intermediate position within the cone, with the fluid passing through the aperture area between the end of the piston and the adjacent portions of the cone taper at a definite velocity. If the pressure of the fluid decreases to the minimum extent within the operating range of the valve, the velocity and force of the flowing fluid on the piston tending to hold it in the cone against the action of the spring 26 would decrease, and the spring would move the piston along the shaft or rod 19 to the fullest extent into the cylinder 15, increasing the annular area 29 between the end 30 of the piston and the adjacent side 28 of the cone taper. Although the velocity of fluid flow has decreased, the volume rate at which the fluid is flowing would remain constant, since the effective aperture area has increased to offset the loss in velocity.

Conversely, if the pressure differential between the high pressure inlet end 40 of the body 10 and the low pressure outlet end 42 of the body increases to the maximum extent, the effect of the accompanying increased flow velocity through the aperture would be to shift the piston 24 into the cone 27 to the fullest extent against the force of the spring 26, decreasing the effective area between the piston end 30 and tapered side 28 of the cone, and holding the rate of flow in quantity per unit of time to the preselected value at the increased velocity. Any variation in flow conditions between the minimum and maximum described would effect an intermediate automatic adjustment of the piston longitudinally of the preselected position of the cone, and would hold the quantity of flow per unit of time constant. As the pressure differential across the valve increases, the flow velocity would also increase, but the piston would move into the cone to decrease the area and hold the volumetric rate of flow constant at the increased velocity. Similarly, as the pressure differential across the valve decreases, the flow velocity would decrease, decreasing the force tending to hold the piston inwardly of the cone and allowing the spring 26 to move the piston outwardly of the cone, increasing the area of the aperture and holding the volumetric rate of flow constant at the decreased velocity.

Figure 5 shows an intermediate position of adjustment of the cone 27 to provide a lesser volumetric rate of flow through the valve device; and Figure 6 shows a third position of adjustment of the cone to provide a minimum, preselected quantity of flow through the valve device. With these positions of adjustment, as well as any others within the capacity of the device, the piston 24 is movable longitudinally of the cone 27 to the same extent in proportion to the changes in velocity of the fluid through the aperture 29. Since the force of the spring 26 is the same for all selected positions of the cone, the velocity of the fluid, and its corresponding force against the piston, has the same operating range between minimum and maximum in effecting movement of the piston 24 from its position fully within the cylinder 15 to its least position within the cylinder. Regardless of the rate of flow to which the cone 27 has been adjusted, variations in pressure differential across the valve device operate the piston in dependence upon the change of velocity of flow through the variable aperture 29.

In order to avoid the effects of pressure differential across the piston 24, producing end thrust on the piston, apertures or equalizing holes 43 are provided through the interior of the piston, so that its opposite and equal end areas are subject to the same pressure acting in opposite directions. Such pressure is the pressure on the low pressure side of the piston 24. The high pressure fluid is prevented from acting on the end areas of the piston, since the latter is operable within the confining cylinder 15, which has no opening to the high pressure fluid, and around which such fluid passes. As a result, the operation of the valve is independent of pressure differentials in the valve mechanism itself, and is dependent only upon changes in the velocity of flow of the fluid through the aperture 29.

It is, therefore, apparent that an automatically operable valve has been provided in which the quantity of fluid flowing per unit of time is maintained substantially constant by a simple and compact mechanism functioning quickly and over a comparatively wide operating range. The functioning of this device is independent of pressure differentials across the valve mechanisms or other variable factors, being dependent solely upon the rate of change of the velocity of the fluid passing through the variable aperture. For any adjusted volumetric rate of flow an increase in velocity of the fluid automatically effects a decrease in the area of the aperture, allowing the fluid to flow at the greater velocity rate, but since the area has been decreased, the quantity of flow is the same as before the change in velocity occurred. Similarly, should the velocity through the aperture decrease, because of a decrease in pressure differential, then the area of the aperture automatically increases to permit the same quantity of fluid to flow through the greater area at the decreased velocity rate of flow. In other words, the adjustment is dependent entirely upon variations in the velocity range, and this range is constant regardless of the preselected positions to which the tapered cone has been adjusted.

While I have shown a preferred form of my invention, it is to be understood that various changes may be made in its construction by those skilled in the art without departing from the spirit of the invention as defined in the appended claims.

Having thus described my invention, what I claim and desire to secure by Letters Patent is:

1. A valve, including a first member and a second member along which fluid may flow, said members forming an aperture therebetween converging in the direction of fluid flow through the valve, one of said members being so constructed and arranged as to be balanced against movement by the inlet pressure of fluid in the valve and subject to longitudinal movement in the direction in which said aperture converges by the fluid flowing therealong to decrease the area of said aperture, and yieldable means engaging said one of said members urging it longitudinally in the opposite direction to increase the area of said aperture, and operable to dispose said one of said members with its outlet end located intermediate the ends of the other member.

2. A valve, including inner and outer members, one of said members having a tapered surface and the other of said members an adjacent cylindrical surface, said surfaces defining an annular aperture converging longitudinally in the direction of fluid flow through the valve, means for balancing said cylindrical surfaced member against longitudinal movement by inlet pressure on said valve, said cylindrical surfaced member being responsive to the flow of fluid along its cylindrical surface for effecting its longitudinal movement toward the valve outlet to decrease the effective area of said annular aperture, and yieldable means for urging said cylindrical surfaced member toward the inlet of said valve to increase the effective area of said annular aperture and operable to dispose the cylindrical surfaced member with its outlet end disposed between the ends of the other member.

3. A valve, including a body having an inlet and an outlet, a cylinder in said body around which fluid from said inlet may flow, a piston slidable in said cylinder and having an external cylindrical surface, a conical member in said body disposed around said piston and having an inner tapered surface converging longitudinally toward said outlet and forming an annular aperture with the cylindrical surface of said piston through which fluid from around said cylinder may pass toward said outlet, and yieldable means for urging said piston toward said inlet.

4. A valve, including a body having an inlet and outlet, a cylinder in said body around which fluid from said inlet may flow, a piston slidable in said cylinder and having an external cylindrical surface, a conical member in said body disposed around said piston and having an inner tapered surface converging longitudinally toward said outlet and forming an annular aperture with the cylindrical surface of said piston through which fluid from around said cylinder may pass toward said outlet, yieldable means for urging said piston in said cylinder toward said inlet and operable to dispose the piston with its outlet end between the ends of said conical member, said piston having a passage therein establishing fluid communication between said cylinder and outlet end of said body.

5. A valve, including a body having an inlet and outlet, a cylinder in said body around which fluid from said inlet may flow, a piston slidable in said cylinder and having an external cylindrical surface, a conical member in said body disposed around said piston and having an inner tapered surface converging longitudinally toward said outlet and forming an annular aperture with the cylindrical surface of said piston through which fluid from around said cylinder may pass towards said outlet, yieldable means for urging said piston in said cylinder toward said inlet and operable to dispose the piston member with its outlet end between the ends of the conical member, said piston having a passage therein establishing fluid communication between said cylinder and outlet end of said body, and means for shifting said conical member in said body.

6. A valve, including a body having an inlet and an outlet, a cylinder in the body having a closed upstream end and around which fluid from said inlet may flow, a piston slidable in said cylinder and having a smooth uninterrupted external surface exposed to fluid flow, a sleeve in said body disposed around said piston and having its interior surface spaced from the exterior surface of said piston, one of said surfaces converging toward the outlet to form a tapered annular aperture through which fluid may flow toward the outlet, and yieldable means urging said piston toward said inlet, said piston having a passage therein establishing fluid communication between said cylinder and outlet end of said body.

7. A valve, including a body having an inlet and an outlet, a cylinder in the body having a closed upstream end and around which fluid from said inlet may flow, a piston slidable in said cylinder and having a smooth uninterrupted external surface exposed to fluid flow, a sleeve in said body disposed around said piston and having its interior surface spaced from the exterior surface of said piston, one of said surfaces converging toward the outlet to form a tapered annular aperture through which fluid may flow toward the outlet, and yieldable means urging said piston toward said inlet, said piston having a passage therein establishing fluid communication between said cylinder and outlet end of said body and means for longitudinally adjusting the position of said sleeve relative to said body.

8. A valve, including a body having an inlet and an outlet, a cylinder in the body having a closed upstream end around which fluid from the said inlet may flow, a piston slidable in said cylinder and having a smooth uninterrupted cylindrical external surface exposed to fluid flow, a sleeve in said body disposed around said piston and having a conical interior surface spaced from the exterior surface of said piston, the conical interior surface of said sleeve converging toward the outlet to form with the exterior of the piston a tapered annular aperture through which fluid may flow towards the outlet, and yieldable means urging said piston toward said inlet and operable to dispose said piston with its outlet end located between the ends of the sleeve, said piston having a passage extending therethrough establishing fluid communication between said cylinder and outlet end of said body, and means for longitudinally adjusting the position of said sleeve relative to said body.

WILLIAM F. BERCK.

References Cited in the file of this patent

UNITED STATES PATENTS

| Number | Name | Date |
|---|---|---|
| 1,504,968 | Owens | Aug. 12, 1924 |
| 1,683,720 | Larsonneur | Sept. 11, 1928 |
| 1,904,337 | Turner | Apr. 18, 1933 |
| 1,926,031 | Boynton | Sept. 12, 1933 |
| 1,944,088 | Linderoth | Jan. 16, 1934 |
| 2,307,949 | Phillips | Jan. 12, 1943 |
| 2,441,220 | Dixon | May 11, 1948 |
| 2,472,737 | Brown | June 14, 1949 |